May 23, 1950  S. H. BURGER  2,508,812
DECORATIVE DEVICE FOR BICYCLE HANDLE BARS
Filed Oct. 11, 1947
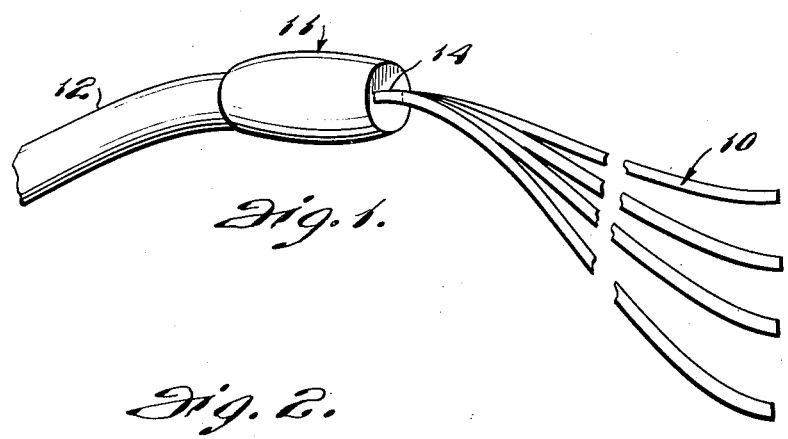
Fig. 1.
Fig. 2.
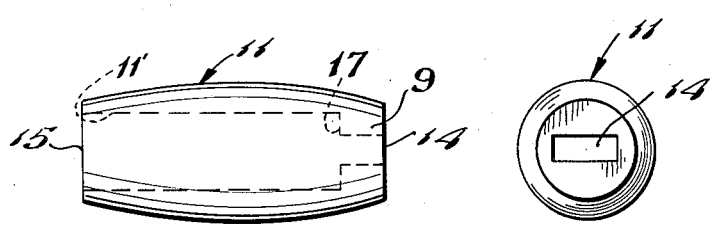
Fig. 3.
Fig. 4.
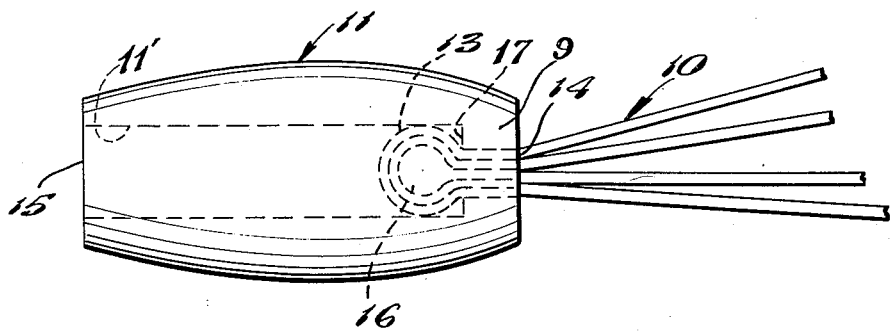
INVENTOR.
SOL H. BURGER
BY Richards Geier
ATTORNEYS Patented May 23, 1950

2,508,812

UNITED STATES PATENT OFFICE 2,508,812

DECORATIVE DEVICE FOR BICYCLE HANDLE BARS

Sol H. Burger, Newark, N. J.

Application October 11, 1947, Serial No. 779,239

2 Claims. (Cl. 41—16.5)

This invention relates to decorative devices and refers more particularly to decorative devices adapted for attachment to handle-bars of bicycles and similar vehicles.

Usually the bicycle handle-bar comprises a hollow bent tubular member over the ends of which hand grips are attached, with nothing to relieve the bleak appearance.

It is an object of the present invention to relieve the usual bleak appearance of bicycle handle-bars.

A further object is to provide a decorative device capable of attracting attention.

Other objects of the instant invention will become apparent in the course of the following specification.

In the accomplishment of these objectives, the decorative device comprises a plurality of superimposed flat flexible streamers of any suitable material, and colored if desired. One end of the superimposed streamers is folded back on the other at the center or at any other convenient point. The transverse line of fold by the very nature of the streamers is substantially bulky. This bulky characteristic of the fold is made use of in attaching the streamers to the hand grip as follows: An aperture is formed in the end of the hand grip having a width substantially equal to the width of the streamers and a height equal to the height of the superimposed streamers at a point substantially removed from the transverse fold. With the hand grip removed from the handle-bar, the free ends of the streamers are inserted through the aperture and the bulky transverse fold pulled taut against the inside periphery of the aperture and the grip replaced. In this way, facility in attaching the streamers is realized and the streamers secured to the end of the hand grip in a substantial manner. The streamers so attached have been found to give a pleasing effect to the bicycle as well as an audible warning when fluttering in the wind.

The invention will appear more clearly when taken in connection with the accompanying drawing showing by way of example a preferred embodiment of the inventive idea.

In the drawings:

Figure 1 is a fragmentary view of a bicycle handle-bar with decorative streamers inserted in end of hand grip.

Figure 2 is a side view of a hand grip adapted for insertion over the end of a handle-bar.

Figure 3 is a right end view of the hand grip shown in Figure 2.

Figure 4 is a side view of a hand grip, enlarged, showing decorative streamers inserted through end thereof.

Referring now in greater detail to the drawings in which like reference numerals indicate like parts, reference numeral 10 indicates the streamers, 11 the hand grip, in the form of a sleeve having a closed end 9 and provided with a cylindrical bore 11' and 12 the bicycle handle-bar.

The decorative streamers 10 are formed of any flat flexible material and colored if desired. One flat flexible member or more than one superimposed flat flexible member are used and one end of the streamer or streamers folded back on the opposite end along a fold line intermediate the ends to form a bulge 13 as shown in Figure 4.

The bicycle handle-bar 12 usually comprises a hollow tubular member bent to facilitate manipulation of the front wheel by the rider in the riding position. At the ends of the bent handle-bar 12, hand grips 11 are usually attached and held thereover by friction or other suitable means. An aperture 14 of rectangular or like shape is formed in the closed end 9 of the hand grip 11 with one dimension approximately equal to the width of the flat flexible streamers 10 and the other substantially equivalent to the height of the folded streamers 10 when superimposed. The aperture 14 communicates with the cylindrical bore 11' of the hand grip or sleeve 11, the end of the bore at the point of communication with the adjacent end of the aperture 14 forming a shoulder 17.

The free ends of the streamers 10 so folded are then inserted through the aperture 14 from the open end 15 of the hand grip 11 when removed from the handle-bar. The insertion may be accomplished by inserting either end of the unfolded streamers 10 through the aperture 14 from either side thereof, subsequently folding the streamers 10 in back of the shoulder 17 and inserting the folded over ends through the aperture 14 on the side of the open end 15 of the hand grip 11. Pulling the free ends of the streamers through the aperture 14 taut will cause the bulge 13 to be embracingly supported by the wall of the bore 11' of the sleeve or grip 11 and bear against the shoulder 17, thereby fixedly anchoring the streamers 10 firmly in position with accidental dislodgement a rarity. Of course, the bulky portion 13 made by the transverse fold is caused by the nature of the material and, if desired, a reinforcing member may be inserted through the aperture 16 formed by the folds.

The streamers may be attached to the handle-bar grips by means of a clip or staple tempered to a hardness giving it a sufficient amount of spring action, so that when the clip or staple is forced into the grip it will be embedded therein and will be held firmly by its own spring action. The clip will be completely invisible within the grip. Any pulling action upon the streamers will have the effect of increasing the hold of the clip within the grip.

It is apparent that the specific illustration shown above has been given by way of illustration and not by way of limitation and that the structure above described is subject to wide variations and modifications without departing from the scope or intent of the present invention.

What is claimed is:

1. The combination with a bicycle handle bar hand grip embodying a sleeve having one end closed, there being an aperture extending through the closed end of said sleeve, of a decorative device projecting from the aperture of the closed end of said sleeve and dependingly supported by the latter, said device comprising a plurality of flat flexible streamers arranged in superimposed relation with respect to each other and folded upon each other along a fold line intermediate their ends to form a bulge, the folded streamers extending from the bulge through and out of the aperture in the closed end of said sleeve, the portions of the streamers along and adjacent the bulge being embracingly supported by the wall of said sleeve.

2. The combination with a bicycle handle bar hand grip embodying a sleeve having one end closed and provided with a cylindrical bore, there being a rectangular-shaped aperture extending through the closed end of said sleeve and communicating with the bore of the latter, the end of the bore of the sleeve at the point of communication with the adjacent end of said aperture forming a shoulder, of a decorative device projecting from the aperture of the closed end of said sleeve and dependingly supported by the latter, said device comprising a plurality of flat flexible streamers arranged in superimposed relation with respect to each other and folded upon each other along a fold line intermediate their ends to form a bulge, the folded streamers extending from the bulge through and out of the aperture in the closed end of said sleeve, the portions of the streamers along and adjacent the bulge being embracingly supported by the wall of said sleeve and bearing against said shoulder to thereby fixedly anchor the bulge in said sleeve.

SOL H. BURGER.

REFERENCES CITED

The following references are of record in the file of this patent:

UNITED STATES PATENTS

| Number | Name | Date |
|---|---|---|
| 164,812 | Crane | June 22, 1875 |
| 221,724 | Curtis | Nov. 18, 1879 |
| 587,956 | Goodman et al. | Aug. 10, 1897 |
| 612,387 | Allen | Oct. 18, 1898 |
| 744,401 | Polak | Nov. 17, 1903 |
| 1,066,045 | Pass | July 1, 1913 |
| 1,370,343 | Montgomery | Mar. 1, 1921 |
| 1,441,936 | McGinnis | Jan. 9, 1923 |
| 2,060,161 | Altmann | Nov. 10, 1936 |
| 2,192,817 | Sanger | Mar. 5, 1940 |
| 2,344,545 | Harder | Mar. 21, 1944 |